July 10, 1951 W. F. GRUPE ET AL 2,559,873
MACHINE FOR AND METHOD OF MANUFACTURING VALVE BAGS
Filed Oct. 19, 1944 11 Sheets-Sheet 1

Fig. 1.

INVENTORS
WILLIAM F. GRUPE
ARTHUR P. BAMFORD
BY
Bartlett Eyre Keel & Weymouth
ATTORNEYS

Fig. 2.

July 10, 1951 W. F. GRUPE ET AL 2,559,873
MACHINE FOR AND METHOD OF MANUFACTURING VALVE BAGS
Filed Oct. 19, 1944 11 Sheets-Sheet 9

INVENTORS
WILLIAM F. GRUPE
ARTHUR P. BAMFORD
BY
ATTORNEYS

July 10, 1951  W. F. GRUPE ET AL  2,559,873
MACHINE FOR AND METHOD OF MANUFACTURING VALVE BAGS
Filed Oct. 19, 1944  11 Sheets-Sheet 10

INVENTORS
WILLIAM F. GRUPE
ARTHUR P. BAMFORD
BY
ATTORNEYS

July 10, 1951 W. F. GRUPE ET AL 2,559,873
MACHINE FOR AND METHOD OF MANUFACTURING VALVE BAGS
Filed Oct. 19, 1944 11 Sheets-Sheet 11

Patented July 10, 1951

2,559,873

UNITED STATES PATENT OFFICE 2,559,873

MACHINE FOR AND METHOD OF MANUFACTURING VALVE BAGS

William F. Grupe, Lyndhurst, and Arthur P. Bamford, Irvington, N. J., assignors to Arkell & Smiths, Canajoharie, N. Y., a corporation of New York Application October 19, 1944, Serial No. 559,448

12 Claims. (Cl. 93—8)

1

The present invention relates to the manufacture of paper bags, and has special reference to machines for and methods of manufacturing multiply valve bags of the type in which a filling sleeve extends through the valve opening.

One of the objects of the invention is to provide a novel and improved machine and method of this character.

Another object of the invention is to provide mechanism which is simple in construction and efficient in operation for forming and applying a supplemental sheet or patch to the valve flap of a valve bag or tube whereby when the valve end of the bag is closed the sheet or patch forms a filling sleeve.

Another object of the invention is to provide novel and improved bag feeding and handling devices.

Still another object of the invention is to provide a machine of the character indicated which may be easily adjusted to enable it to be used in the manufacture of bags having valves of different sizes.

The several features of the invention, whereby these and other objects may be attained, will be readily understood from the following description and accompanying drawings, in which.

The machine illustrated in the drawings is particularly adapted for use in the manufacture of paper bags of the multi-wall valve type illustrated in Figs. 11 through 18. This bag 2 may

2 have the usual bellows or gusseted sides 4 and an inwardly turned valve flap 6 having a flap extension 7. The bag is also provided with a valve sleeve which is formed by securing a supplemental sheet or patch 8 to the valve extension 7. The upper end of this type of bag is usually closed by a line of stitching, and when the sleeve patch 8 has been applied, the stitching is extended through the upper longitudinal edges thereof so as to form a sleeve extending into the bag through which the filling nozzle may be inserted. The patch 8 has one of its outer end edges 11 cut on an incline so that one outer end of the completed sleeve will project a distance beyond the other side and thus allow for easy insertion of the bag filling nozzle.

Figures 11, 12, 13, 14:
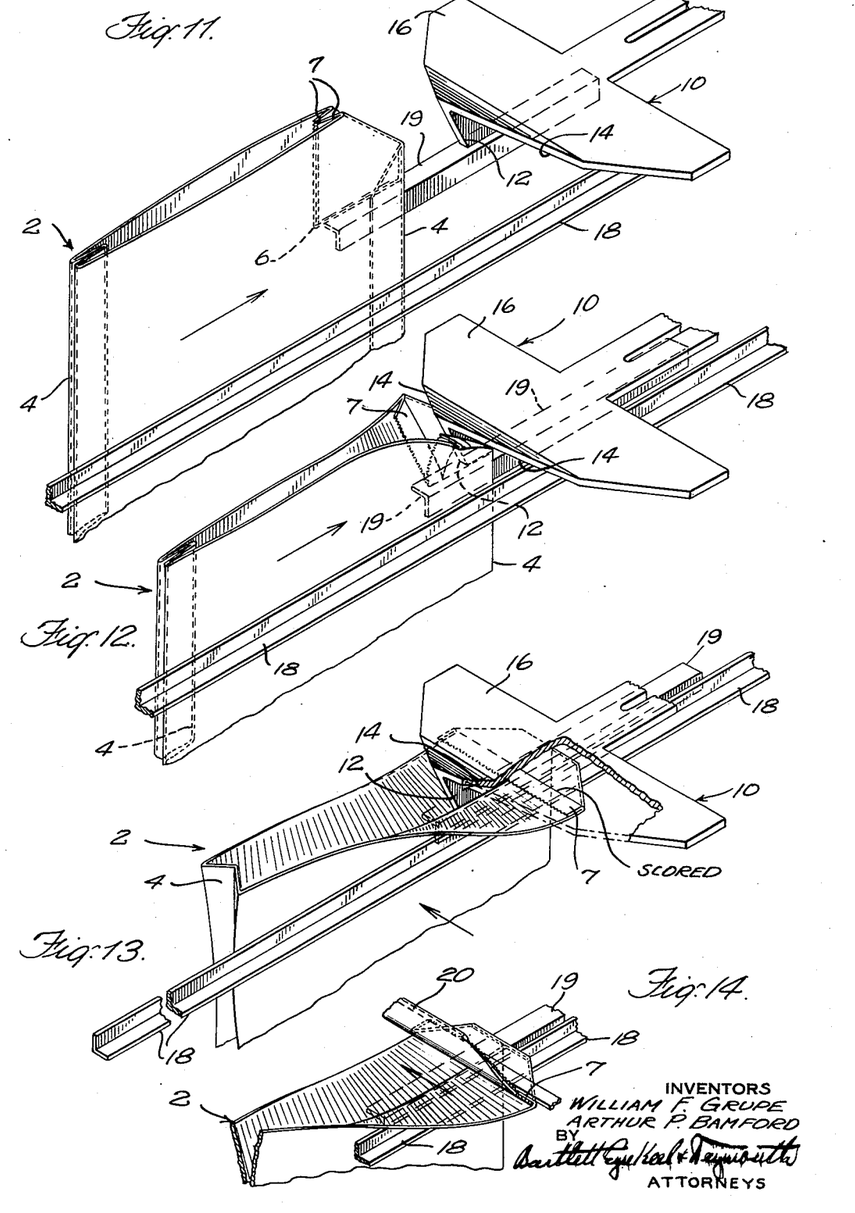
Figs. 11 through 18 are views in perspective of a portion of a bag tube and certain forming devices therefor, the bag tube being shown in different stages of manufacture.

In accordance with the present invention, the valve flap 6 is first folded or tucked in, then the bag tube placed in vertical position and fed edgewise to cause the valve portion of the bag tube to engage a suitable former 10 (Fig. 11). This former has a downwardly and rearwardly inclined central nose portion 12 which, as the bag is fed, initially enters the valve and during the continued feeding movement of the bag tube, the vertical side walls of the valve engage the inclined portions 14 of the former so as to spread the valve portion of the bag tube (Fig. 12). During the continued movement of the bag tube the valve passes under a flat portion 16 of the former so as to finally flatten the valve portion (Fig. 13).

As the bag tube thus passes beneath the former 10, one of a series of pairs of clamping jaws 18 and 19, engages opposite sides of the bag tube directly beneath the flattened valve portion. These clamping jaws then feed the bag tube sidewise from beneath the former 10. As the bag tube is thus fed the extension 7 of the valve flap enters suitable folding devices 20 which serve to fold it back upon itself (Fig. 14).

Figures 15, 16:
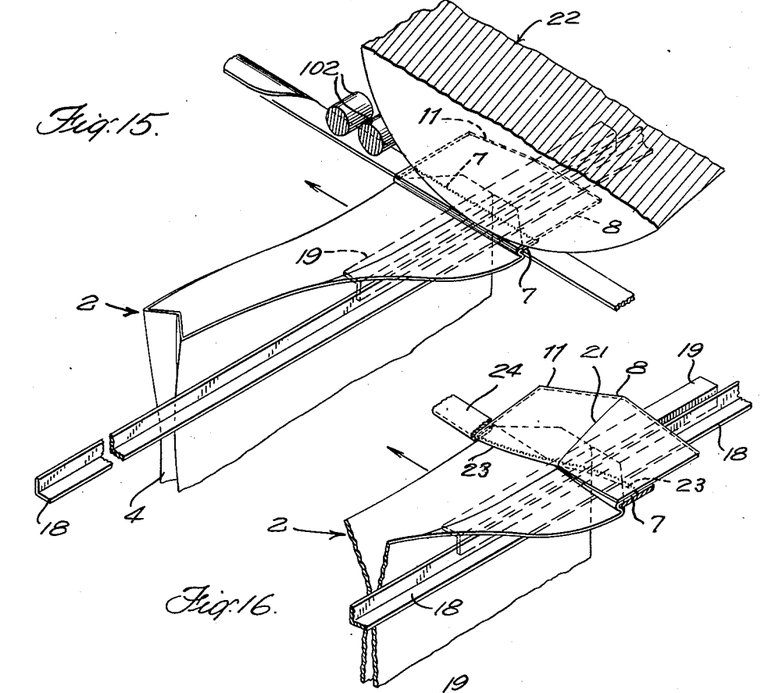

After the bag tube leaves the folding devices 20 it passes beneath a transverse roller 22 which applies the sleeve patch 8 to the valve flap (Fig. 15). Previously to the application of the sleeve patch the patch is scored on a line 21 extending centrally longitudinally of the patch and on a line 23 extending transversely and spaced from the inner margin thereof. Also the underside of the inner margin of the patch is coated with adhesive and this coated portion is applied to the folded over flap extension 7 of the valve flap so that the sleeve patch is thus securely affixed thereto.

Figures 17, 18:
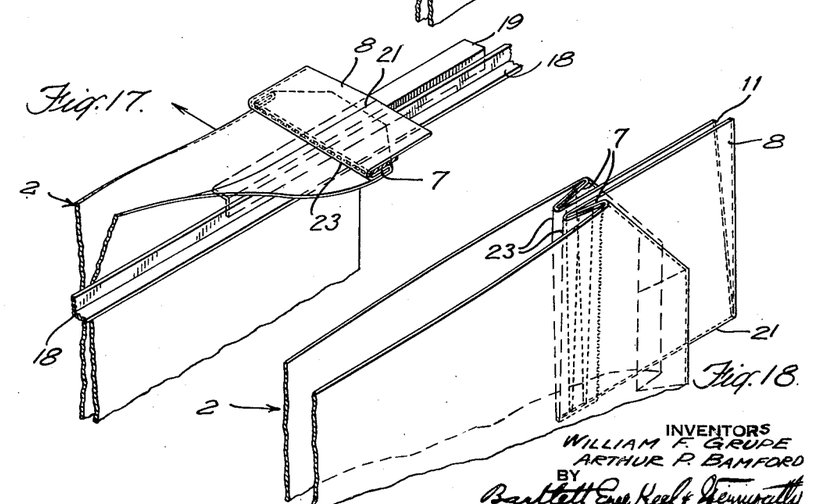

During the continued sidewise movement of the bag tube, the pasted inner portion of the sleeve patch and the folded flap extension 7 enter suitable folding devices 24 which serve to return the extension 7 to its initial unfolded condition, and at the same time to bend the sleeve patch back over the inner edge of the valve (Figs. 16 and 17).

During the further continued sidewise movement of the bag tube, suitable devices hereinafter described, engage the side walls of the valve and bring them into vertical position as shown in Fig. 18, with the longitudinal edges of the valve patch 8 directed upwardly. The upper end of the bag tube is ready for closing in the usual manner by sewing, the line of stitching extending through the upper edges of the patch 8 to complete the filling sleeve.

Figure 1:
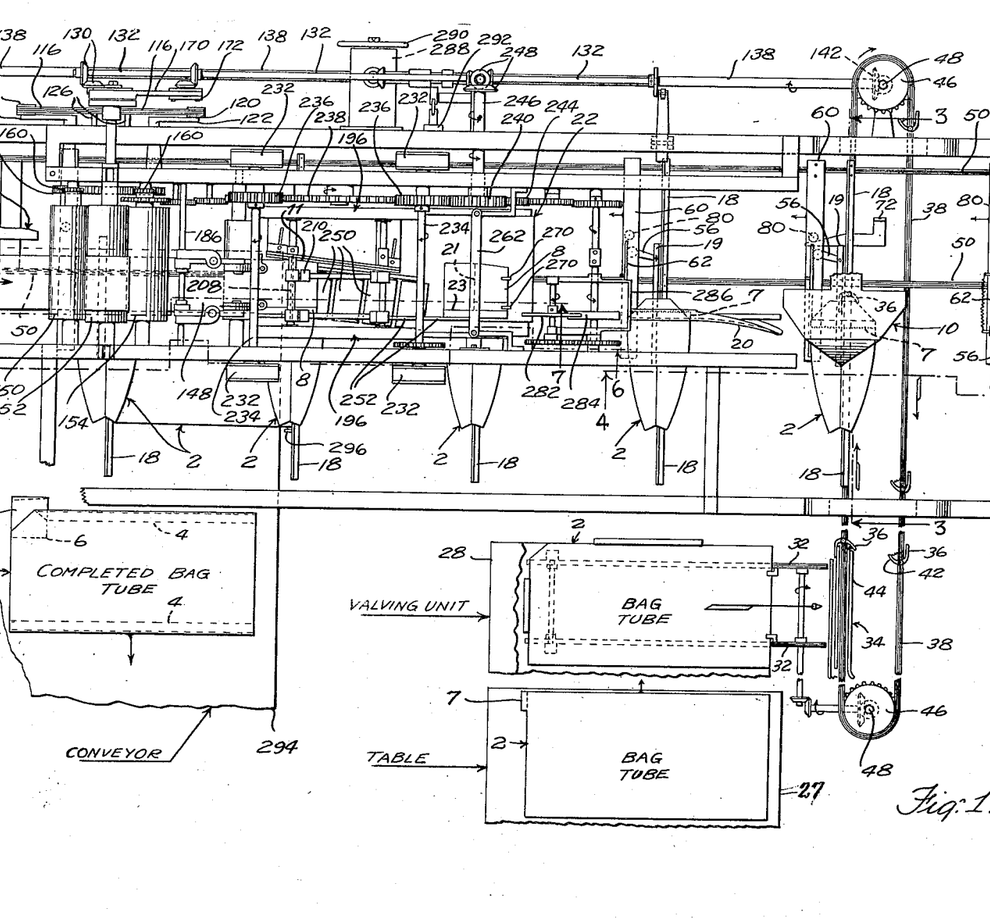
Figure 1 is a plan view, partly diagrammatical, of the machine in its preferred form.

Referring to Fig. 1 of the drawings, the bag tubes to be operated upon may be supplied to the machine in a stack that is positioned on a table 27. The tubes are successively fed from the stack through the valving unit 28, each bag tube being fed edgewise with the longitudinal edge thereof adjacent the bag valve directed rearwardly. Such feeding of the bag tube to the valving unit may be done either by hand or automatically. The valving unit 28 may be of a conventional type.

After each bag tube is thus valved, a suitable conveying device comprising sprocket chains 32 feed the bag tube longitudinally and deposit it in vertical position in a rack 34, the valve end of the bag tube being directed upwardly.

Figure 2:
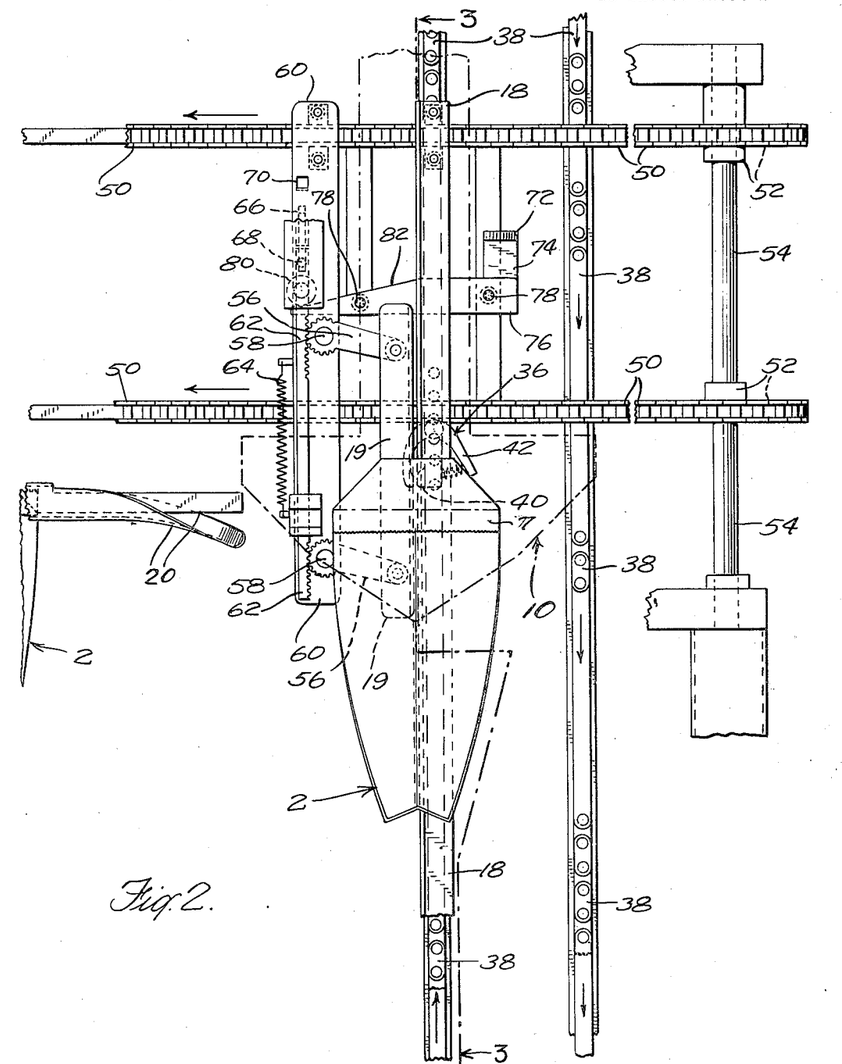
Fig. 2 is a plan view, on an enlarged scale, corresponding to the right-hand portion of Fig. 1.
Figure 3:
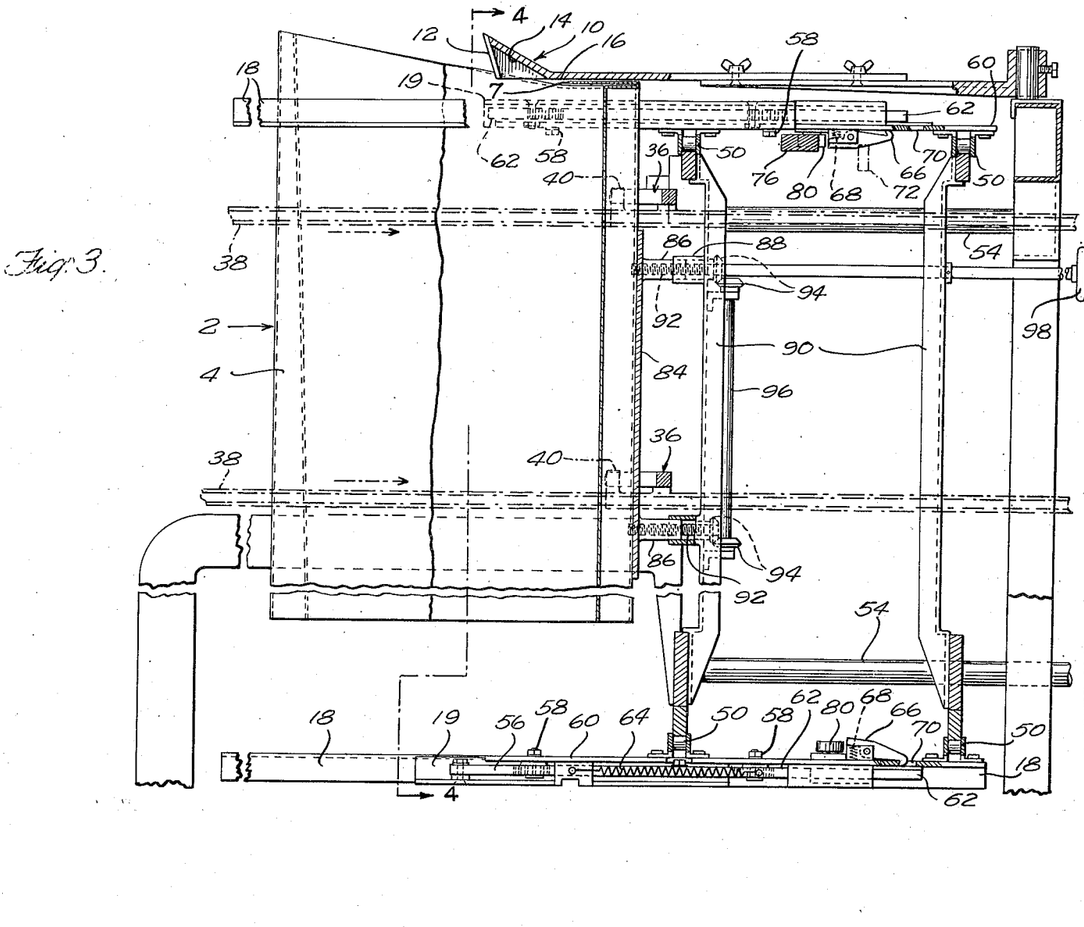
Fig. 3 is a sectional view, partly in elevation, taken substantially on the line 3—3 of Figs. 1 and 2.

As each bag tube is deposited in the rack 34, gripping devices 36, carried by endless chains 38, engage the rear edge of the bag tube at points spaced from the upper and lower ends of the tube (Figs. 1, 2 and 3). These gripping devices may be of conventional form having one member 40 consisting of a fixed jaw, and the other member spring-pressed and provided with a projecting tongue 42. The tongues 42 are adapted to ride over a cam plate 44 on the rack 34 and to be released to grip the bag tube as each tongue 42 passes the rear end of the plate 44. The chains 38 pass over sprocket wheels 46 carried by vertical shafts 48.

As each bag tube is thus conveyed rearwardly by the conveyor chains 38, the valve corner of the tube engages the former 10 to flatten the valve portion as above described, and also the portion of the bag tube beneath the valve passes between the jaws of one of the series of pairs of clamping jaws 18 and 19.

The several pairs of jaws 18 and 19, are carried by and equally spaced about endless chains 50 which pass over sprocket wheels 52 carried by horizontal shafts 54 at the right and left hand ends of the machine.

The jaw 18 of each pair of clamping jaws is arranged transversely of and fixed to the chains 50 and each movable jaw 19 is mounted on the ends of arms 56 which are pivoted on pins 58 carried by a transverse bar 60 fixed to said chains (Figs. 2 and 3). The hubs of the arms 56 associated with each pair of jaws 18 and 19 are provided with pinion teeth which engage teeth on a rack bar 62 which is mounted to slide in bearings on the bar 60. The rack bar 62 is urged in one direction by means of a spring 64 to turn the arms 56 to move the clamping jaw 19 to clamp the bag tube against the clamping jaw 18. Each pair of clamping jaws 18 and 19 are held open until a bag tube is received between them by means of a latch 66. This latch is pivotally mounted on the rack bar 62, and is urged in one direction by means of a coiled spring 68. The latch 66 normally engages in a notch 70 in the supporting bar 60 so as to hold the rack 62 in a position to maintain the clamping jaws 18 and 19 open.

As each pair of clamping jaws 18 and 19 approach a position to receive a bag tube conveyed by the sprocket chains 38, the outer end of the latch 66 engages a cam surface 72 on an arm 74 of a bracket 76 secured by bolts or screws 78 to the machine frame. This engagement of the latch 66 with the cam surface 72 causes the release of the latch from the notch 70, whereupon a cam roll 80 carried by the rack bar 62 engages a cam surface 82 on the bracket 76. During the continued travel of the sprocket chains 50, the cam surface 82, as the cam roll passes thereover, allows the spring 64 to act through the arms 56 to close the clamping jaws 18 and 19 on the bag tube.

Figure 4:
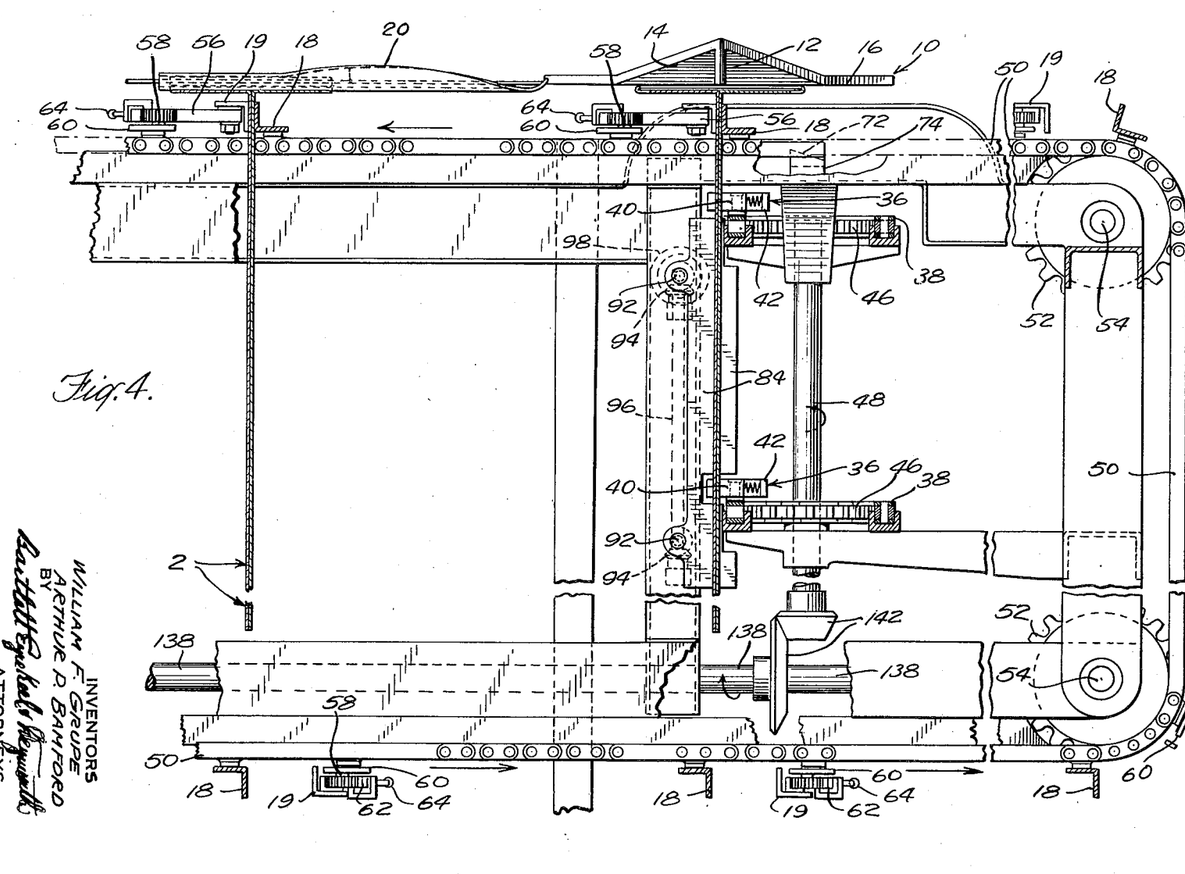
Fig. 4 is a sectional view, partly in elevation, taken on the lines 4—4 of Figs. 1, 2 and 3.

The movement of the bag tube into a position between the clamping bars 18 and 19 is limited by the engagement of the bag tube with a vertical index plate 84 mounted on the machine frame (Figs. 3 and 4).

In order to accommodate the machine for different length valve flaps, the index plate 84 is adapted to be adjusted fore and aft of the machine. To provide for this, the plate 84 is provided with rearwardly projecting lugs or sleeves 86 which extend into bearings 88 on a support 90 which forms a part of the machine frame. Shafts or rods 92 are screw-threaded through the sleeves 86, and the rods are arranged to be turned in unison through means of miter gears 94 connecting the rods with a vertical shaft 96. The upper rod 92 is extended rearwardly and is provided with a hand wheel 98. With this construction, upon turning the hand wheel 98 the index plate 84 may be adjusted as desired.

When each bag tube reaches its rearmost position against the index plate 84, the clamping jaws 18 and 19 close on the bag tube and cause the bag tube to be conveyed sidewise by the conveyor chains 50, the grippers 36 at this point being carried by the conveyor chains 38 out of gripping engagement with the bag tube.

As each bag tube is thus fed sidewise the extension 7 of the valve flap enters between the folding blades 20 which fold back the extension upon the flap as above described.

Figure 5:
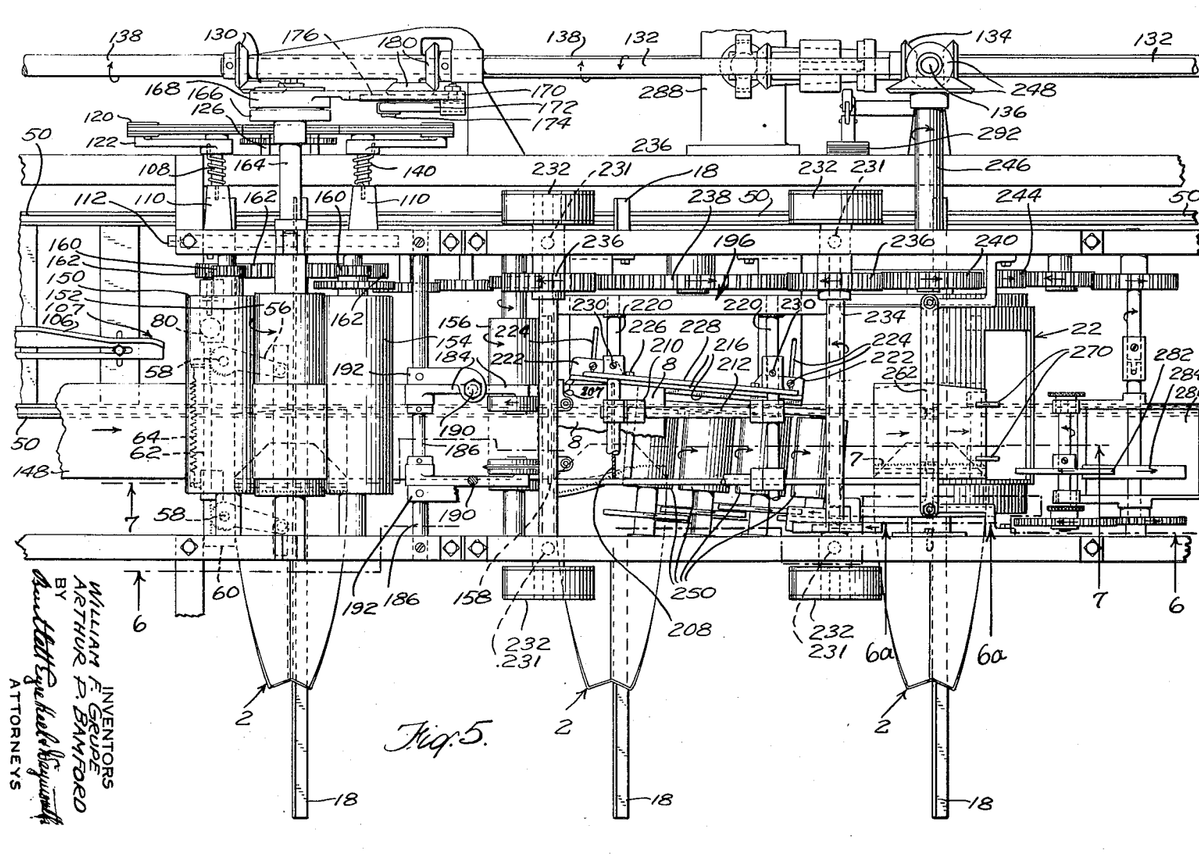
Fig. 5 is a plan view, on an enlarged scale, corresponding to the left-hand portion of Fig. 1.
Figures 6, 6A:
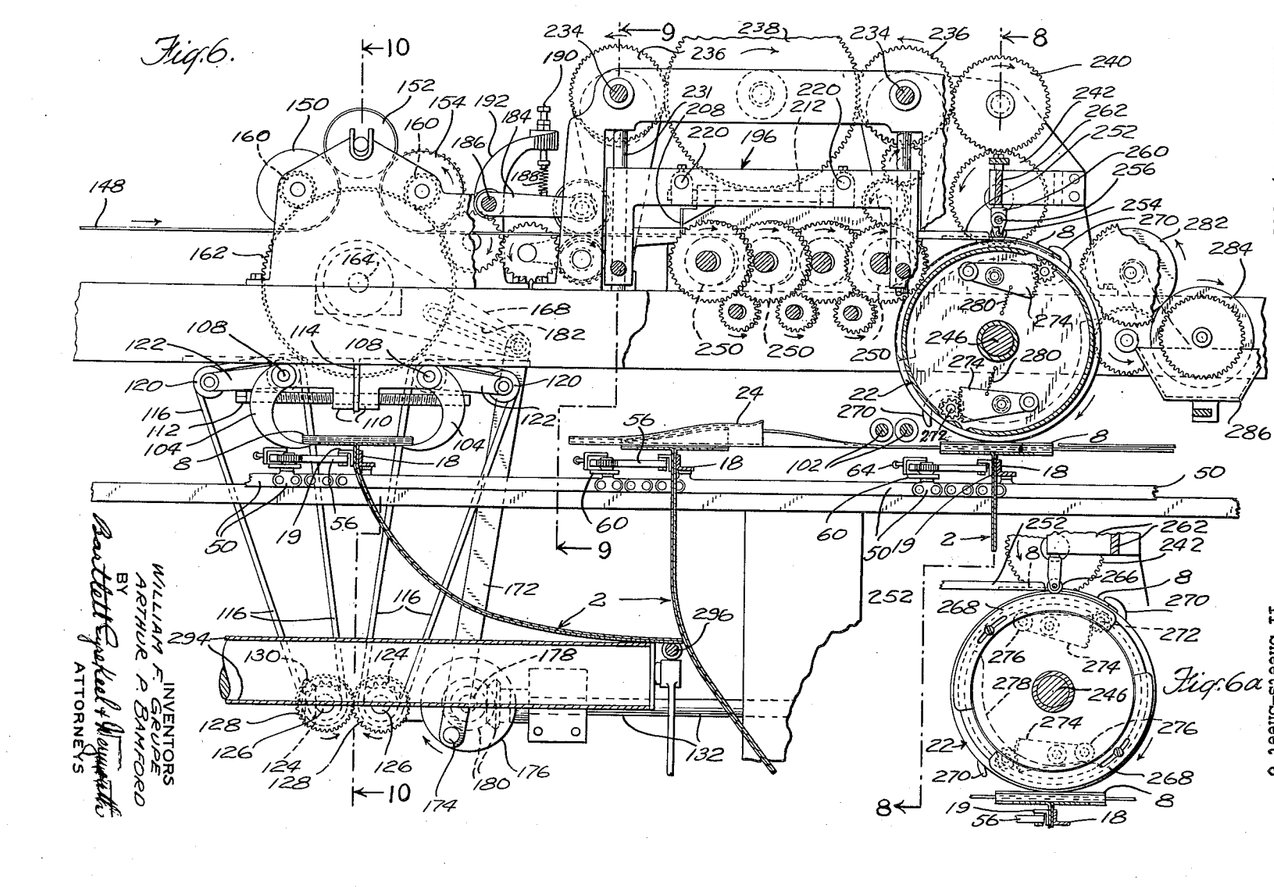
Fig. 6 is a longitudinal sectional view, taken on the line 6—6 of Figs. 1 and 5.
Fig. 6a is a detail sectional elevation taken on the line 6a—6a of Figs. 5 and 8.
Figure 7:
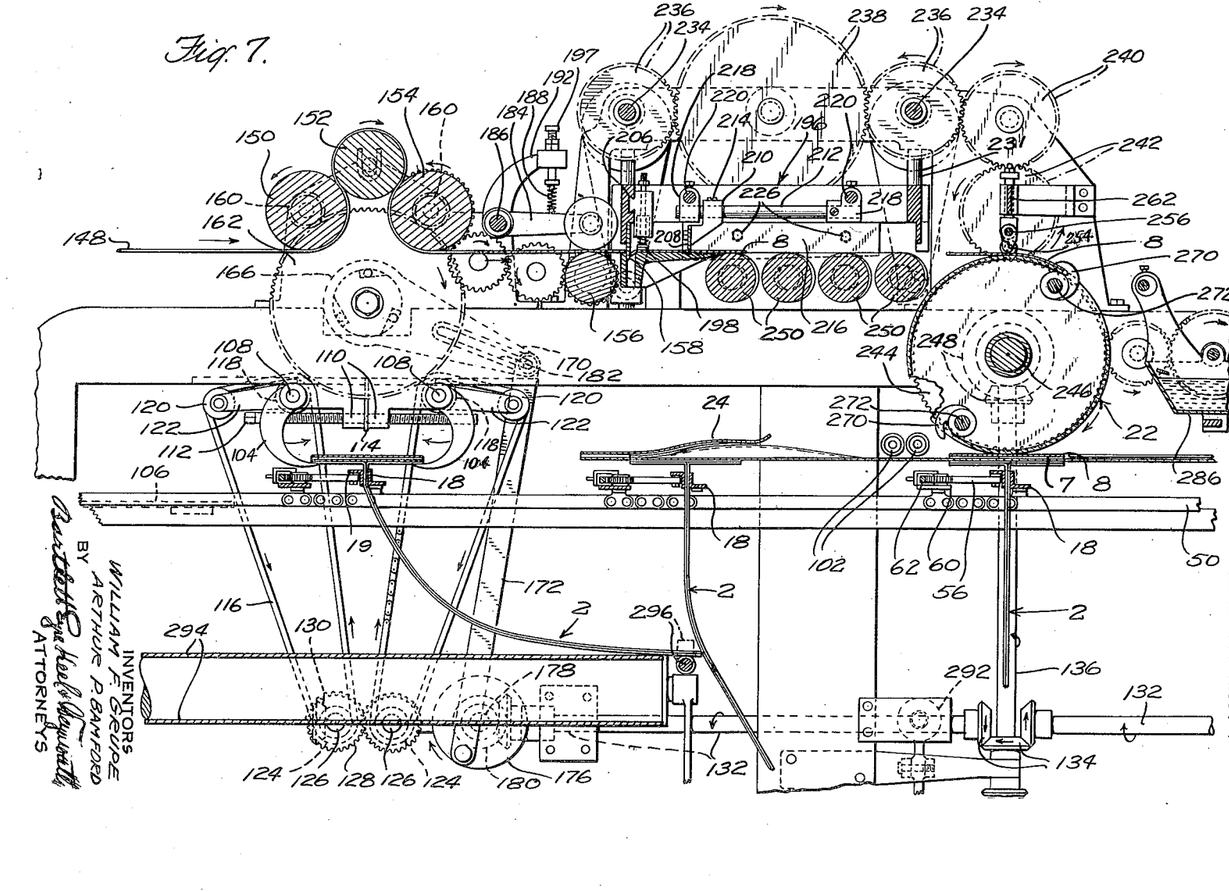
Fig. 7 is a longitudinal sectional view, taken on the line 7—7 of Figs. 1 and 5.

After passing the folding blades 20, the valve portion of the bag tube passes beneath the transfer wheel 22 where the inner margin of the patch 8 is adhesively secured to the folded over valve extension 7 as above described (Figs. 5, 6 and 7).

After passing from beneath the transfer wheel 22, the valve portion with the patch applied passes beneath presser rollers 102 which firmly press the inner margin of the patch against the folded over extension 7 of the valve flap. The valve portion with the patch attached then passes between the folding blades 24 where the folded over valve extension 7 is returned to its unfolded condition, and the valve patch is folded over the edge of the valve flap as shown in Fig. 17.

After leaving the folding devices 24, the valve portion of the bag tube passes beneath rotating fingers 104 which are swung against the outer sides of the valve so as to tend to quickly bring the walls of the valve toward each other. Simultaneously with such operation of the fingers 104, the clamping jaws 18 and 19 open to release the bag tube. Such straightening up of the valve walls insures against the walls catching on the clamping jaws 18 and 19 as the bag tube drops therefrom.

The clamping jaws 18 and 19 are thus opened to release the bag tube by engagement of the cam roll 80 on the rack bar 62 with a cam surface 106 on a plate 107 secured to the machine frame.

The curved fingers 104 are secured on shafts 108 which are mounted to turn in bearings on blocks 110 which are mounted to slide through dove-tail connections 111 with the machine frame. The blocks 110 are adapted to be adjusted to move the shafts 108 toward and from each other by means of a left and right-hand screw 112 screw-threaded through lugs on the underside of said blocks, the inward movement of the lugs being limited by a fixed stop plate 114. The shafts 108 are rotated to rotate the curved arms 104 by means of sprocket chains 116, each of which passes over a sprocket wheel 118 on the associated shaft 108, idler 120 on the end of an arm 122, and a sprocket wheel 124 on a shaft 126. The two shafts 126 are connected to be driven at the same speed in opposite directions by gears 128 secured thereon. The drive for these shafts 126 comprises miter gears 130 connecting one of the shafts with a counter-shaft 132 journaled in bearings at the rear of the machine (Fig. 5). The countershaft 132 is driven through miter gears 134 by a vertical shaft 136 which is driven from a shaft 138, through gearing hereinafter described, journaled in bearings at the rear of the machine.

The arms 122 which carry the idlers 120 are pivotally mounted on the shafts 108, and are connected with the shafts through springs 140 coiled about the shafts and having one end connected to the arms and their other ends secured to the sliding blocks 110. These spring-actuated arms 122, with their idlers 120, serve as takeup devices for the sprocket chains 116 during the adjustment of the curved fingers 104 toward and from each other.

The above provision for adjusting the axis of the curved fingers 104 toward and from each other by turning the right and left-hand screw 112 is for the purpose of compensating for bags having different width valves.

Figure 8:
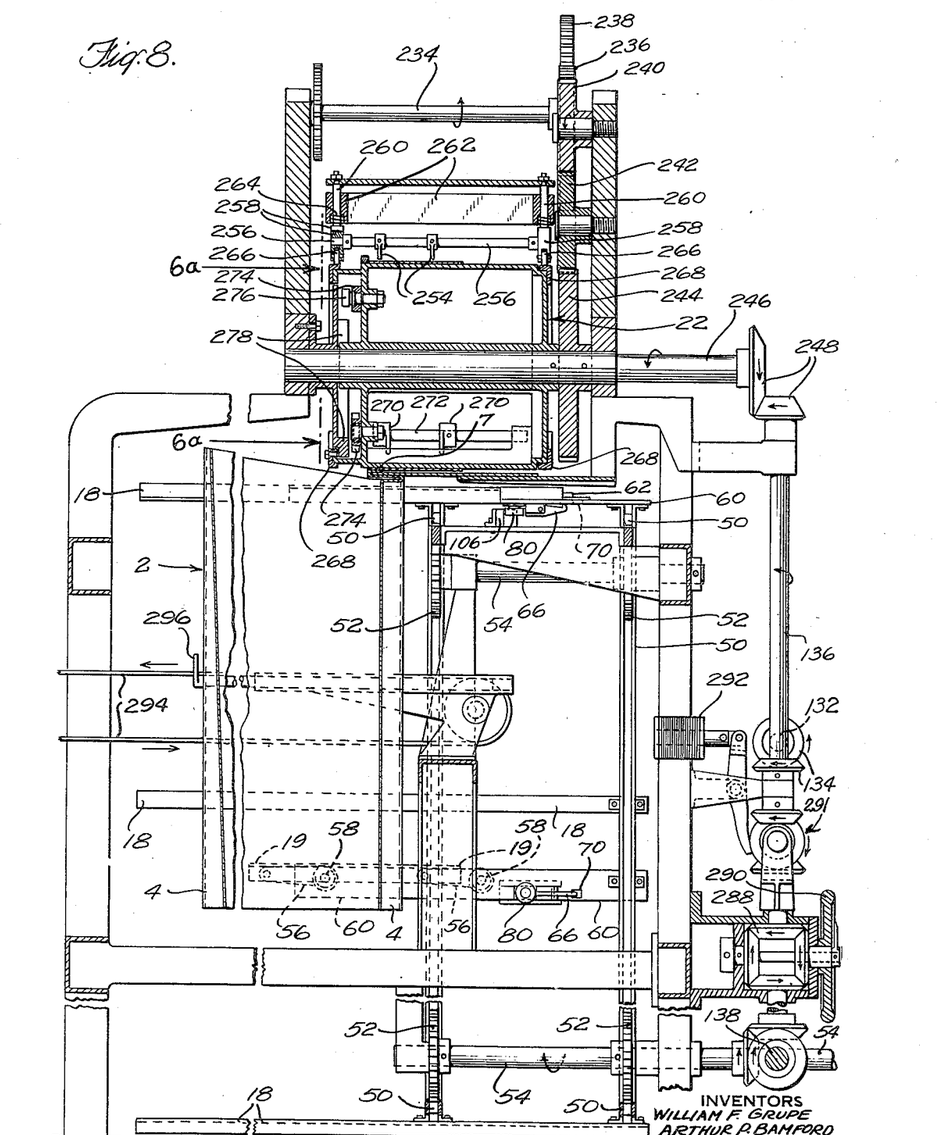
Figs. 8, 9 and 10 are transverse sectional views, taken on the lines 8—8, 9—9 and 10—10, of Fig. 6.
Figures 9, 10:
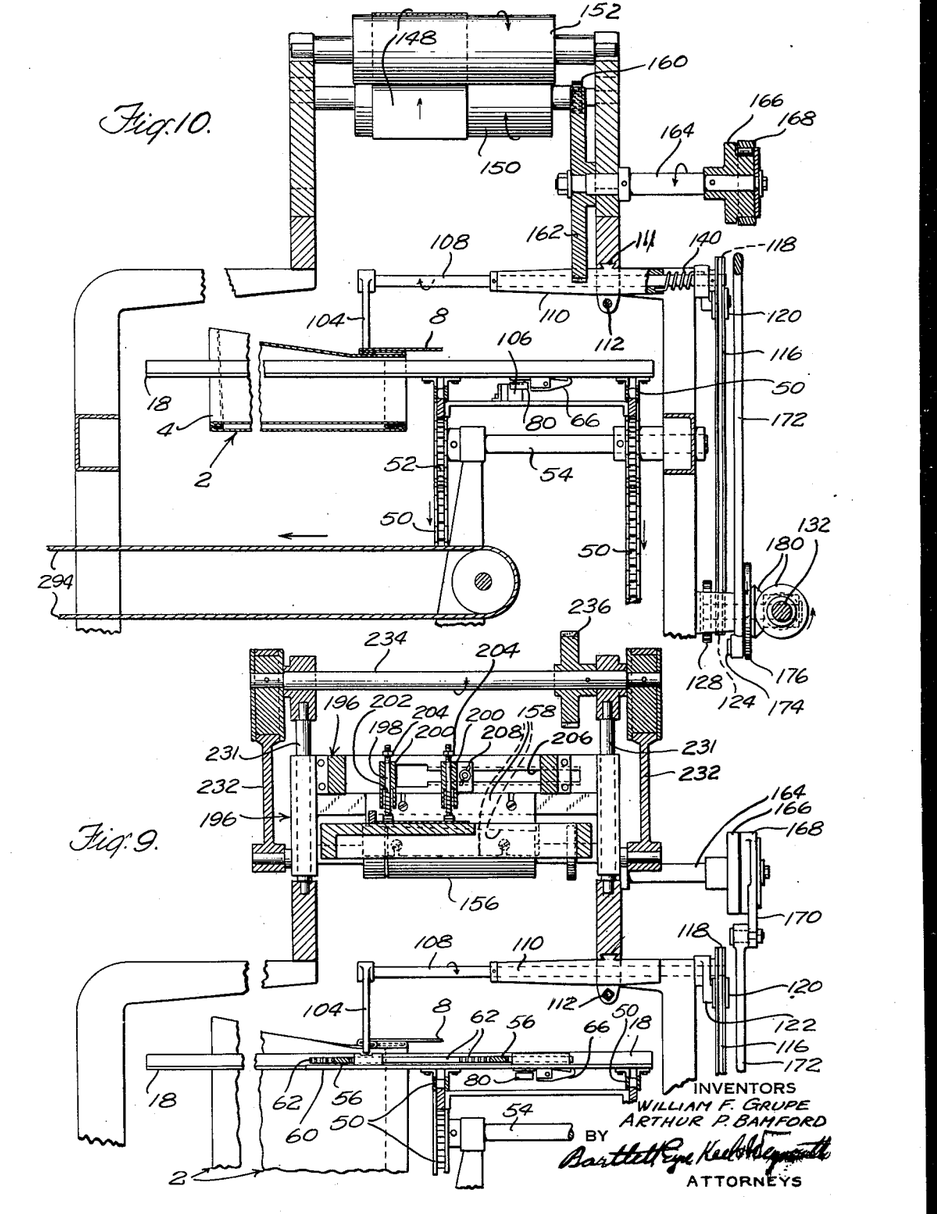

The drive for the conveyor chains 38 for feeding the bags rearwardly as described, comprises bevel gears 142 connecting the lower end of the rear sprocket shaft 48 with the horizontal shaft 138 at the rear of the machine. The shaft 138 is driven through miter gears 144 connecting the shaft with the left-hand one of the horizontal sprocket shafts 54 for the lateral conveyor chains. This shaft also constitutes the main driving shaft of the machine (Figs. 1 and 8).

The sleeve sheets or patches 8 are cut from a strip 148 which passes under a feed roll 150, over a feed roll 152 and beneath a feed roll 154 and then between feeding and scoring rolls 156 which score the strip to form the transverse score line 23 of each patch. The strip then passes between cutting-off knives 158 which sever the patches from the inner end of the strip (Figs. 5, 6 and 7).

The strip feed rolls 150, 152 and 154 and the feeding and scoring rolls 156 are intermittently driven to successively present measured portions of the strip to the cutting-off knives 158. The rolls 150, 152 and 154 are driven through pinions 160 secured on the ends of the shafts thereof which are engaged by a gear 162. The gear 162 is secured on a shaft 164 which extends through bearings on the machine frame, and on its rear end carries the driven member 166 of a one-way overrunning roller clutch. The driving member 168 of said clutch is provided with an arm 170 that has its outer end pivotally connected with one end of a link 172, the other end of the link being pivotally connected with a crank pin 174 on a disk 176. The disk 176 is mounted on a stud shaft 178 which is driven through bevelled gears 180 with the counter-shaft 132.

In order to vary the speed of the feeding of the strip and thus vary the length of sleeve patches 8 cut off from the end of the strip, the pivotal connection between the link 172 and the clutch arm 170 is adapted to be adjusted longitudinally in an elongated slot 182 in the clutch arm.

The lower one of the feeding and scoring rolls 156 is driven through a chain of gears connecting the shaft of the roll with the shaft of the roll 154. The upper feeding and scoring roll 156 consists of two rollers each of which is mounted to turn on a stud on the end of an arm 184, the two arms being pivotally mounted on a stationary shaft or rod 186 having its ends secured in the machine frame. Each of the two upper rollers 156 is pressed downwardly by means of a coiled spring 188 interposed between the top of its supporting arm 184 and the lower end of a screw 190 which is screw-threaded through an aperture in a bracket arm 192 secured to the rod 186. By adjusting the screws 190 the pressure of the upper rollers 156 may be varied.

The front one of the section or roller of the upper roll 156 is provided with an annular scoring rib and the lower roll 156 is provided with a cooperating scoring groove for scoring the strip to form the transverse score line 23 on each patch as above described.

The upper one of the cutting-off knives 158 is carried by a rectangular frame-like carrier 196 which is adapted to be reciprocated vertically to effect the cutting-off action of the knives. Also mounted on this carrier 196 are two pressure feet 198, each of which is formed on the end of a rod which extends through a bracket boss 200. Each presser foot is pressed downwardly by means of a spring 202 coiled about its rod and interposed between the presser foot and the associated boss, the downward movement of the presser foot being limited by a nut 204 screw-threaded on the upper end of the boss. The rear bracket boss 200 is mounted to slide in a dove-tail groove 206 in the carrier and is held in adjusted position by means of a clamping screw 207 (Fig. 5). The provision for adjusting the rear presser foot toward and from the other is to compensate for different length sleeve patches.

Also, carried by the carrier 196 is a scoring blade 208 for forming the longitudinal center score line 21 in each patch. This scoring blade 208 is secured on the ends of bracket arms 210 that are secured on rods 212. The bracket arms 210 are adapted to be adjusted along the rods 212 to adjust the position of the blade 208 for different width patches and held in adjusted position by means of clamping screws 214. The rods 212 are secured in bracket members 218 secured on transverse rods 220 carried by the frame carrier 196.

Also, mounted on the carrier 196 is the upper one of knives 216 which are for the purpose of cutting the sleeve patch 8 on the bias to form the inclined edge 11 of the sleeve patch. The lower knife 216 has rearwardly projecting lugs 222 that are mounted on cross-bars forming a part of the machine frame and are adjustable to vary the position of the knife laterally by means of a suitable screw and slot connection 224. The upper knife 218 is secured by screws or bolts 226 to a plate 228 that is mounted on the rods 220, and is adapted to be adjusted on these rods to adjust the position of the knife laterally and hold it in adjusted position by means of clamping screws 230. Such provisions for lateral adjustment of the knives is for the purpose of compensating for different length patches 8.

The frame carrier 196 is adapted to be reciprocated vertically on rods 231 to operate the upper cutting-off knife 158, presser feet 198, scoring blade 208, and the angle cutting knives 216, by means of arms 232 having their lower ends pivotally connected with the carrier and their upper ends eccentrically connected with shafts 234 (Figs. 5 and 6). The shafts 234 are rotated to actuate the arms 232 through gears 236 secured thereon which are operatively connected by a large idler gear 238. The right hand gear 236, viewing Fig. 7, is driven through gears 240 and 242 by a driving gear 244. The gear 244 is secured on a shaft 246 which is driven through bevel gears 248 by the vertical shaft 136 (Figs. 7 and 8).

After each patch 8 is cut off from the strip by the cutting-off knives 158, and during the upward movement of the carrier from 196 the patch is fed to the transfer wheel 22 by means of feed rollers 250, the transfer wheel also being secured to the shaft 246.

These feed rollers 250 are arranged in a horizontal plane at a suitable angle to tend to maintain the patch against a guide-board 252 so as to insure the patch being delivered to the transfer wheel 22 in the proper position with relation to the inner edge of the patch.

As the advancing edge of the patch reaches the transfer roll 22, it engages stop fingers 254 which are secured on a horizontal rod 256 (Fig. 8), the ends of which are mounted in blocks 258 that are provided with upwardly projecting pins 260 mounted to slide in apertures in a bracket member 262 on the machine frame. The stop fingers 254 are pressed downwardly by means of springs 264 coiled about the pins 260 and interposed between the bracket member 262 and the blocks 258. At the lower ends of the blocks 258 are cam rolls 266 which engage cam plates 268 mounted on one side of the transfer wheel 22 (Fig. 6a).

The transfer wheel 22 carries two pairs of grippers 270, each pair being secured on a shaft 272 journaled in bearings in the transfer wheel 22, the grippers working through slots in the wheel. Each shaft 272 is adapted to be operated to cause its pair of grippers 270 to clamp the advancing end of the sleeve patch on the transfer wheel, by means of a pinion on the shaft 272 which is engaged by a segment 274 pivoted on a side of the transfer wheel. Each segment 274 is adapted to be operated in one direction during the rotation of the transfer wheel to open the associated pair of grippers by a cam roll 276 which engages a fixed cam 278 on a disk secured to the machine frame. Each segment 274 is adapted to be moved in the opposite direction to cause the grippers to grip the patch by means of a coiled spring 280 connected therewith.

With this construction, when a sleeve patch 8 has engaged against the stop fingers 254, upon engagement of the advancing ends of the cam 268 with the cam rolls 266, the stop fingers 254 are raised allowing the patch to pass therebeneath. As the advancing end of the patch passes beneath the fingers one of the pairs of grippers 270 is permitted by its cams 278 to grip said end of the patch against the surface of the transfer wheel, thus pulling the patch therewith.

As the patch is thus carried by the transfer wheel, adhesive is applied to the inner margin thereof by means of a paste wheel 282. This wheel 282 receives its paste from a wheel 284 which extends into a glue pot 286. After the patch receives the paste from the paste roll 282, the transfer wheel 22 carries the patch into position to apply it to the folded extension 7 of the valve flap as hereinbefore described.

The several feed rolls 250 are all driven through suitable gearing connection with one of the gears 236 that is at the right of the large idler gear 238 viewing Figs. 6 and 7. The glue rolls 282 and 284 are driven through gearing connection with the large gear 244 on the shaft 246.

In order to compensate for different width sleeve patches, means is provided for adjusting the angular position of the transfer wheel 22 and other patch handling devices with relation to the chain conveyors 50 and 38 for the bag tubes.

To provide for this, there is interposed between the driving shaft 138 and the shaft 136 which drives the transfer wheel 22 and the other patch-handling devices, a differential indexer 288 of conventional type having an indexing wheel 290. Upon turning the wheel 290 the angular position of the shaft 136 with relation to the shaft 138 may be varied to effect the desired adjustment.

It will be apparent that the construction of the machine is such that any suitable one-revolution clutch mechanism, indicated at 291 may be interposed between the shafts 136 and 138 which may be controlled by a suitable stop mechanism (not shown) acting through a solenoid 292, whereby in case one set of gripping jaws 18 and 19 fails to receive a bag, the patch applying mechanism will be thrown out of operation until the next set of gripping jaws with the bag carried thereby is presented to the transfer wheel 22.

Previously to the release of each bag tube after the patch has been applied thereto, the lower end of the bag tube rides over one edge of a belt-conveyor 294 as shown in Fig. 6. During the continued travel of the bag tube and as the gripping jaws 18 and 19 release the bag, the bag drops down upon the conveyor to be conveyed from the machine. As the bag engages the edge of the belt-conveyor and is carried thereover, its advancing edge engages a stop finger 296 which guides the bag until it is carried past the finger, at which time the bag is released and drops upon the conveyor. The position of this finger may be adjusted to compensate for different width bags.

It will be apparent that the machine as illustrated and described is simple in construction and capable of a high rate of production; that the bag tubes are uniformly operated upon as they are fed from the valving unit through the machine, first to spread and flatten the valves and thereafter to secure the sleeve patches to the valve flaps in such a manner as to ensure that upon closing the valve end of the bag tubes, the filling sleeves will be properly formed; that the valve patches are accurately cut out and scored; and that the machine may be easily and quickly adjusted for bags having valves of different widths and lengths.

As will be evident to those skilled in the art, our invention permits various modifications to be made without departing from the spirit thereof or the scope of the appended claims.

What we claim is:

1. In a machine for use in the manufacture of valve bags of the class described, means for spreading and flattening the valve of a valve bag previously to closing the valve end of the bag, means for folding the inner end of the valve flap back upon itself, and means for securing the inner end of a sleeve patch to the outer surface of the folded over end of the valve flap.

2. In a machine for use in the manufacture of valve bags of the class described, means for spreading and flattening the valve of a valve bag previously to closing the valve end of the bag, means for folding back upon itself the inner end of the valve flap, means for securing the inner end of a sleeve patch to the outer surface of the folded over end of the valve flap, means for returning said end of the valve flap to its unfolded condition whereby the inner secured end of the sleeve patch is positioned on the underside of the valve flap, and means for folding the remaining portion of the sleeve patch over the upper side of the valve flap.

3. In a machine for use in the manufacture of valve bags of the class described, means for feeding a sleeve patch and for applying adhesive to the inner end margin of one side thereof, means for feeding a valve bag having the valve thereof in flattened condition, and means for folding the inner end of the valve back upon itself to present the outer side of the surface of said folded end to the adhesive bearing end surface of the sleeve patch as the sleeve patch is being fed.

4. In a machine for use in the manufacture of valve bags of the class described, a transfer wheel, means for rotating the wheel in one direction, means for feeding a sleeve patch on to the peripheral surface of the wheel with the inner edge of the patch extending circumferentially of the wheel, gripping devices carried by the wheel for retaining the patch in position on the wheel during the continued rotation of the wheel, a stopping device adapted to be projected to limit said feeding movement of the sleeve patch on to said wheel so as to cause the patch to be in a predetermined position on the wheel when engaged by said gripping devices and adapted to be retracted upon said gripping devices engaging the patch, means for thus operating said stopping device, means for spreading and flattening the valve of a valve bag previously to closing the valve end of the bag, means for presenting the inner margin of the valve flap to the inner margin of said sleeve patch when the patch is carried by the wheel to a predetermined position, means for then operating said gripping devices to release the patch, and devices for applying adhesive to said inner margin of the sleeve patch as the patch is carried by the transfer wheel to said predetermined position so as to adhesively secure the patch to the valve flap.

5. In a machine for use in the manufacture of valve bags of the class described, a transfer wheel, means for rotating the wheel in one direction, means for presenting a sleeve patch in a predetermined position on the peripheral surface of the wheel with the inner edge of the patch extending circumferentially of the wheel, gripping devices for retaining the patch in said position on the wheel during the continued rotation of the wheel, devices for applying adhesive to the underside of the inner margin of the patch as it is thus carried by the wheel, means for spreading and flattening the valve of a valve bag previously to closing the valve end of the bag, means for feeding the bag with the valve in said condition, and devices for folding back the inner end of the valve flap as the valve is thus fed, said feeding means being so arranged with relation to said transfer wheel and so operated in timed relation thereto as to cause the surface of the inner margin of the patch that bears the adhesive and the outer side of the turned over margin of the flap to be applied one to the other when said feeding means and said transfer wheel reach a predetermined point in their travel, and means for then releasing said gripping devices from the patch.

6. In a machine for use in the manufacture of valve bags of the class described, means for feeding a valve bag previously to closing the valve end of the bag edgewise in vertical position with the valve and adjacent longitudinal edge thereof leading, means for effecting spreading and flattening of the valve as the bag is thus being fed, means for releasing said bag from said feeding means after the valve has been placed in said condition, means for then feeding the bag sidewise while maintaining the valve in said condition, means for folding back upon itself the inner margin of the valve flap during the latter feeding movement of the bag, and means for securing the inner margin of a sleeve patch to said folded over margin of the flap during the continued sidewise feeding movement of the bag.

7. The method of applying a patch to the valve flap of a valve bag to form a filling sleeve which comprises folding the inner end of the flap back upon itself, pasting the inner margin of the patch over the outer side of said folded end of the flap, returning said end of the flap to its unfolded condition so as to position said pasted margin of the patch on the under side of the flap, and folding the remaining portion of the patch over the outer side of the flap.

8. In a machine for use in the manufacture of valve bags of the class described, means for feeding a valve bag with its valve corner in spread and flattened condition, means for folding the inner end of the valve flap back upon itself, means for securing the inner end of a sleeve patch to the outer surface of the folded over end of the valve flap, means for returning said end of the valve flap to its unfolded condition, with the patch thus attached, and means for thereafter closing the valve and discharging the bag from the machine.

9. In a machine for use in the manufacture of valve bags of the gusseted bag type, means for feeding a bag with the gusseted valve edge leading, means cooperating with said feeding means for spreading and flattening the valve corner of the bag while the bag is thus fed, means for feeding the bag sidewise while the valve corner is held in flattened and spread condition, and means cooperating with said last mentioned means for applying a patch to the flap of the valve during the latter movement of the bag, the bag being held in substantially vertical position during both of said feeding movements thereof.

10. In a bag feeding mechanism of the class described, means for successively feeding valve bags edgewise in vertical position to a predetermined station, means cooperating with said feeding means for spreading and flattening the valve during said feeding movement, means engaging each bag as it reaches said station and then feeding the bag sidewise while retaining it in vertical position, and the valve in spread and flattened condition, and means cooperating with said last mentioned means for applying a sleeve patch to the valve while the bag is fed with the valve in said condition.

11. In a bag feeding mechanism of the class described, a supporting rack for receiving and holding a valve bag in vertical position, means for successively delivering bags to said rack, an endless conveyor having sets of spring-pressed gripping devices for successively gripping and conveying bags edgewise from the rack while retaining them in vertical position, the gripping devices engaging the leading vertical edge of the bags, a stop member in the path of the bags serving to stop said feeding movement of each bag as the bag engages the stop, the gripping devices being carried by the conveyor out of gripping engagement with the bags upon engagement of the bags with said stop member, means for spreading and flattening the valve during said feeding movement, a second endless conveyor having pairs of clamping jaws spaced thereabout for successively receiving the bags as they engage said stop member so as to successively convey the bags sidewise while retaining them in vertical position and the valve in spread and flattened condition, and means for applying a sleeve patch to the valve during the last mentioned feeding movement of the bag.

12. A structure according to claim 11 in which means is provided for adjusting the position of said stop member to vary the distance said bags are conveyed by the first mentioned carrier.

WILLIAM F. GRUPE.
ARTHUR P. BAMFORD.

REFERENCES CITED

The following references are of record in the file of this patent:

UNITED STATES PATENTS

| Number | Name | Date |
|---|---|---|
| 948,439 | Beam | Feb. 8, 1910 |
| 1,153,295 | Dunnebier et al. | Sept. 14, 1915 |
| 1,155,505 | Niles | Oct. 5, 1915 |
| 1,182,364 | Furman | May 9, 1916 |
| 1,227,217 | Juengat | Aug. 27, 1918 |
| 1,540,295 | Swift | June 2, 1925 |
| 1,723,164 | Hartman | Aug. 6, 1929 |
| 1,737,608 | Nelson | Dec. 3, 1929 |
| 1,775,829 | Potdevin | Sept. 16, 1930 |
| 1,783,575 | MacDonald | Dec. 2, 1930 |
| 1,880,839 | Currier | Oct. 4, 1932 |
| 2,001,295 | Barber | May 14, 1935 |
| 2,053,263 | Coty et al. | Sept. 8, 1936 |
| 2,184,362 | Sauerman | Dec. 26, 1939 |
| 2,202,496 | La Bombard | May 28, 1940 |
| 2,249,451 | Bischoff et al. | July 15, 1941 |
| 2,252,388 | Sidebotham | Aug. 12, 1941 |

FOREIGN PATENTS

| Number | Country | Date |
|---|---|---|
| 15,487 | Australia | Sept. 6, 1928 |